United States Patent [19]

Toman et al.

[11] 3,774,214
[45] Nov. 20, 1973

[54] SCANNING BEAM GUIDANCE METHOD AND SYSTEM
[75] Inventors: Donald J. Toman, Pleasantville, N.Y.; Lloyd J. Perper, Tucson, Ariz.
[73] Assignee: Tull Aviation Corporation, Armonk, N.Y.
[22] Filed: Jan. 7, 1971
[21] Appl. No.: 104,668

[52] U.S. Cl. ......... 343/108 M, 343/106 R, 343/109
[51] Int. Cl. ............................................... G01s 1/14
[58] Field of Search .................. 343/106 R, 108 M, 343/109

[56] References Cited
UNITED STATES PATENTS
2,283,054  5/1942  Gossel.................................. 343/109
2,509,230  5/1950  Himmel .............................. 343/109

*Primary Examiner*—Benjamin A. Borchelt
*Assistant Examiner*—Denis H. McCabe
*Attorney*—Curtis Ailes

[57] ABSTRACT

Guidance signals are radiated in a scanning beam with portions of the scanning beam coverage spaced on each side of a guidance path plane, the ratio of the respective amounts of simultaneous modulation by two different modulation signals is varied as a function of the scan position of the scanning beam, the variation of modulation being substantially symmetrical about the guidance path plane.

15 Claims, 4 Drawing Figures

SCANNING BEAM GUIDANCE METHOD AND SYSTEM

This invention relates to an improved guidance method and system employing radio signals for guiding a craft. The invention is particularly useful for aircraft guidance for approach to a landing strip, and in landing upon that strip. The invention is useful for guiding watercraft and other vehicles in addition to aircraft. The guidance is always accomplished with respect to a fixed ground station. The guidance path may be a path which approaches or departs from the ground station, and the same path may be used for both functions. For instance, the method and system may be used to establish an aircraft descent path for change from an upper altitude to a lower altitude, or as a descent path for landing approach of an aircraft. Conversely, the system may be used to establish a guided ascent path for an aircraft, such a strictly defined ascent path being particularly useful in the vicinity of high traffic airports. However, the system is particularly well adapted as a landing guidance system for an aircraft, and since this is a broadly recognized guidance instrument system function, the present invention is described in terms of aircraft landing approach guidance. Nevertheless, it will be understood that the system is also useful for other guidance functions as suggested above.

The present commercial instrument landing systems employ directional radio beam patterns in which there are usually the equivalent of two relatively wide overlapping beams which define the guidance path, the two beams being emitted at substantially the same carrier frequency and being modulated with different signal frequencies. Thus, for instance, in a conventional slope control, the aircraft receiver sees the equivalent of two wide overlapping beams, the upper beam having the carrier modulated with 90 Hz (cycles per second) and the lower beam having the carrier modulated with 150 Hz. Thus, the aircraft receives a "fly down" signal when the 90 Hz signal predominates, and a "fly up" signal when the 150 Hz signal predominates. When the 90 and 150 Hz signals are substantially equal, the aircraft is on the prescribed glide slope course. The effective beams for this function must be wide enough to cover the desired guidance space so as to permit an aircraft entering the guidance pattern to detect the presence of the guidance pattern and to be captured by the pattern. This means that relatively wide beams must be used. However, the difficulty with wide beams is that serious inaccuracies are caused by reflections of the wide beam signals due to the presence of unwanted reflecting objects within the width of the beam such as surface irregularities in the terrain, vegetation, the presence of buildings in the area, and the presence of other aircraft. This problem is particularly aggravated in the conventional glide slope control system because at UHF the beam width is so great that reflections of the transmitted signals from the ground are necessarily a part of the total transmitted signal. Thus, the surface of the ground becomes essentially a part of the transmitting antenna system. Accordingly, irregularities in the terrain are particularly troublesome.

Therefore, it is one object of the present invention to provide an improved aircraft instrument approach and landing system in which the problems of signal errors due to reflections are minimized by transmission of the signals in a narrow scanning beam such that each position of the beam is relied upon to cover only a small portion of the total guidance space, the beam in all of its scanning positions being transmitted directly from the antenna into the guidance space without reliance upon reflection from the ground.

It is another object of the present invention to provide an improved radio instrument guidance system in which the signal format is such that it can be received and processed by existing aircraft instrument landing system receivers, or by such receivers supplemented by a bare minimum in additional equipment.

Another object of the present invention is to provide an instrument guidance system in which only a narrow band width is necessary for each channel.

Further objects and advantages of the invention will be apparent from the following description and the accompanying drawings.

In carrying out the objects of the invention there is provided an improved method of transmitting radio signals for an instrument guidance system comprising generating radio carrier frequency energy, radiating the radio carrier frequency energy in a scanning beam having a predetermined space relationship with a prescribed guidance path plane to be established, with portions of the scanning beam being placed on each side of the guidance path plane, the direction of scan being substantially perpendicular to the guidance path plane. The method also includes modulating the radio carrier frequency energy simultaneously with two different modulation signals, and varying the ratio of the respective amounts of modulation by said two different modulation signals as a function of the scanning of the scanning beam, the variation of said modulation ratio being substantially symmetrical about the guidance path plane so that said modulation signals are respectively dominant on opposite sides of the plane and the value of the ratio is one at the plane.

Figure 4:
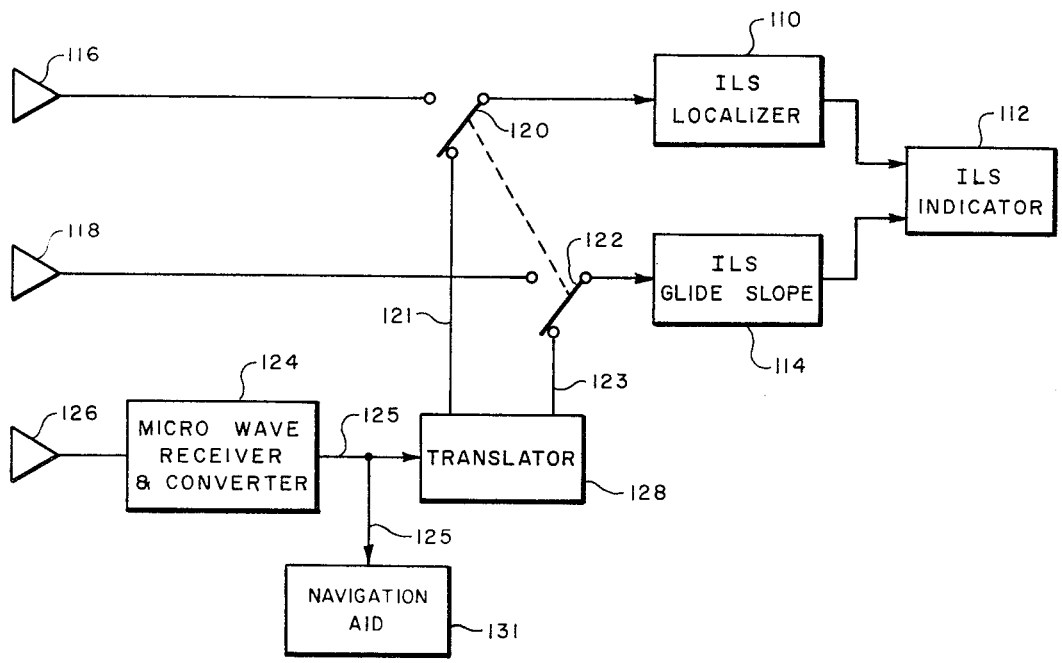

And FIG. 4 is a schematic block diagram of a receiver arrangement which may be employed as the vehicle mounted receiver in the practice of the present invention.

Figure 1:
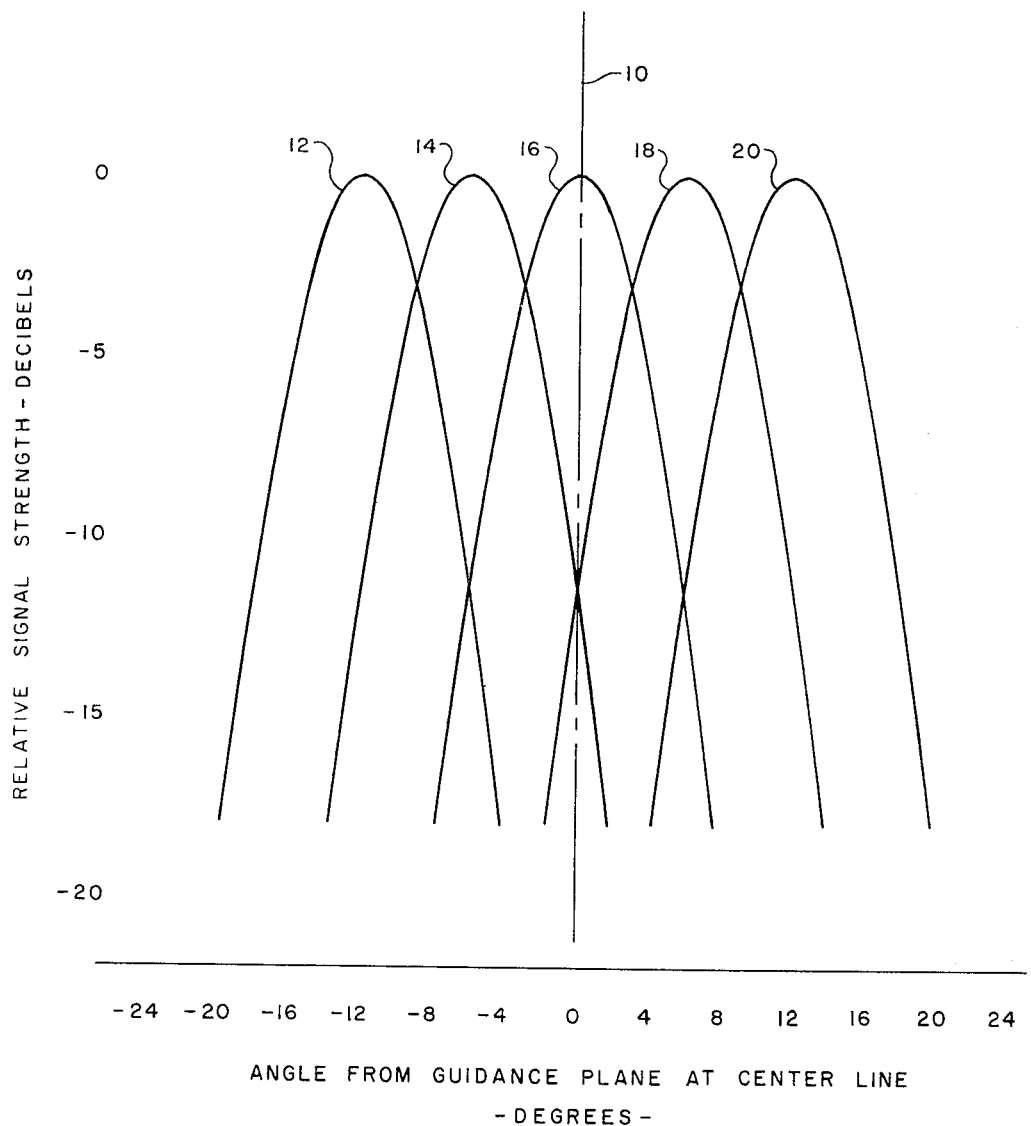
FIG. 1 is a diagram showing the shape of the scanning beam in successive positions of the scanning beam as produced in accordance with the present invention.

Referring more particularly to FIG. 1, there is shown a diagram illustrating different positions 12, 14, 16, 18, and 20 of a scanning beam which may be used for instance for localizer (azimuth) directional guidance. The center line 10 represents a guidance path plane which is essentially perpendicular to the surface of the two-dimensional diagram of FIG. 1. The direction of outward radiation of the scanning beam in each of its positions is generally indicated as upward in the diagram of FIG. 1. The beam, in each of its positions, is fan-shaped so that its transverse dimension is greater in a direction parallel to the guidance plane 10 than it is in the transverse direction perpendicular to that guidance plane. The relative signal strength beam patterns illustrated in FIG. 1 show the outline of the beams in a plane perpendicular to the guidance plane at the center line 10. As illustrated, the radiation beam shape at each position is nevertheless wide enough, in this narrow beam dimension, to overlap substantially with adjacent beams. Thus, at each beam position illustrated, the beam overlaps with at least two other beam positions at some substantial signal strength portion of the beam.

In FIG. 1, the vertical measurement (ordinate) represents relative signal strength in decibels, the peak signal strength being represented as zero and the reduced signal strength of the remainder of the beams being indicated in negative values downwardly from zero. The horizontal measurement (abscissa) represents an angular measurement away from the guidance plane at the center line 10 expressed in degrees. The outermost beam patterns 12 and 20 generally represent the outer limit positions of the scan.

In the preferred form of the invention, the beam, in all of its positions, is simultaneously modulated with two different signals, the predominant one of the two signals directing the vehicle to one side or the other of the guidance plane 10. Typically, the guidance modulation signals are respectively 90 Hz and 150 Hz, the beams 12 and 14 having the 90 Hz signal predominating, and the beams 18 and 20 having the 150 Hz signal predominating. If a vehicle, such as an aircraft, is in the space where the energy from beams 12 or 14 predominates so that the 90 Hz modulation signal predominates, the vehicle is directed towards the guidance plane 10 by that predominant signal. Conversely, if the vehicle is in the space where the energy from beams 18 and 20 predominates so that the 150 Hz signal is strongest, the vehicle is directed in the opposite sense towards the guidance plane 10. Thus, the modulation of the beam at the various beam positions 12–20 is carried out with variations in the modulation signals which are a function of the scanning of the scanning beam. This variation is carried out in such a manner that the ratio of the two modulation singals varies as a function of scanning, the center beam position 16 representing equal amplitudes of the two guidance modulation signals at 90 and 150 Hz so that the ratio can be expressed as having the value "one." On the left side, the ratio of the 90 Hz modulation increases as a predetermined function of the scan change in position. This function is not necessarily a linear function. Thus, the beam position 14 may provide a ratio of 90 Hz to 150 Hz modulation of essentially 3 to 1 while the beam position 12 may represent a ratio as high, or higher, than 25 to 1. The variation on the opposite side of the guidance plane 10 may be symmetrical. Thus, the ratio at beam position 18 may be 1 to 3, and at beam position 20 it may be 1 to 25.

It is an important feature of the invention that, by providing a substantial overlap of the radiated beam energy in each of the beam positions in relation to the adjacent beam positions, and by providing simultaneous modulation with guidance signals in all beam positions, a relatively high load factor is provided in the radiated energy for all receiver positions. By employing this combination, it has been determined that it is possible to employ a vehicle receiver which is of the continuous wave type to receive the scanning wave signals, while retaining all of the advantages of scanning wave transmission. Thus, a receiver may be employed which is also capable of receiving constant wave signals from other transmitters.

The modulation of the carrier energy may be amplitude modulation, or it may preferably be a pulse duration modulation signal in which the respective durations of successive bursts of carrier frequency energy are modulated in length so that when successive bursts are taken together they are recognized as carrying the modulation signals. With this arrangement, the radio frequency energy is radiated intermittently in the scanning beam at successive scan positions. For instance, referring again to FIG. 1, the scan operation may proceed by emission of a burst of carrier frequency energy in beam position 12 followed by successive bursts from beam positions 14, 16, 18, and 20, and then the process may be repeated again and again. The pulse widths, or durations, in each beam position are varied to carry the simultaneous modulation by the modulating frequencies. This pattern of radiation may be carried out by scanning with a physically movable single antenna element, but it is preferably carried out by "switched scanning" with separate antenna elements for each of the beams 12, 14, 16, 18, and 20, to which the radio frequency energy is successively switched in synchronism with the pulse duration modulation. Another method of scanning which may be employed in the present invention, with either amplitude modulation or pulse duration modulation, is by the use of a single fixed antenna and by the employment of phase variations to obtain the scanning effect electrically. There are a number of reasons for the preference for pulse duration modulation in the practice of the present invention. For one, the pulse duration modulation fits very naturally with the "switched scanning" described above. Since the carrier energy must be interrupted for the scan switching, it can be modulated in the course of that same switching by simply modulating the length of the individual bursts of carrier. Another very important advantage is that pulse duration modulation is easily generated with great accuracy by digital synthesis methods, as described more fully below. Pulse duration modulation, particularly with digital synthesis, is advantageous because it avoids the difficult problem, otherwise encountered in amplitude modulation, of maintaining relative amplitudes of the signal frequencies with great precision. Finally, pulse duration modulation is advantageous because it minimizes the problem of loss of signal in the receiver by means of the peak signal clipping effect of the automatic volume control circuits within the receiver.

Amplitude modulation may also be employed with the switch scanning. Since the switched scanning preferably proceeds at a frequency which is much higher than the signal frequencies, the amplitude of the carrier envelope during a single pulse (burst of carrier) does not change significantly. The modulation operation is essentially a sampling operation in which the amplitude modulated carrier is developed by modulating a carrier with outputs from the appropriate modulating wave form sampled at the beam scanning frequency. This combination of amplitude modulation with pulse sampling is referred to hereinafter as pulse amplitude modulation.

Figure 2:
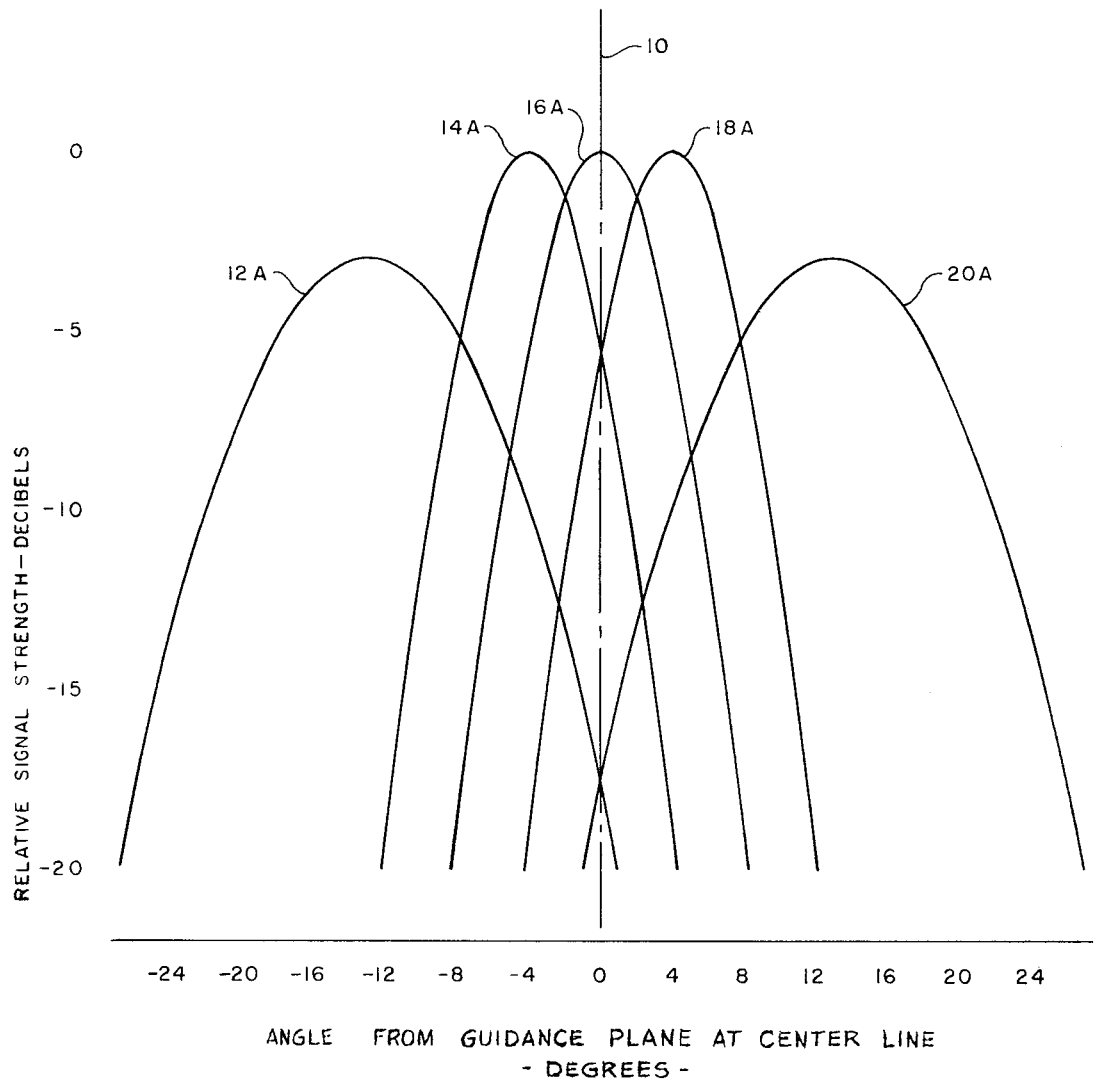
FIG. 2 shows a preferred alternative form of the shape of the scanning beam in successive positions of the scanning beam as produced in accordance with the present invention.

FIG. 2 is a modified beam radiation pattern generally corresponding with the pattern of FIG. 1, but representing a preferred pattern which is obtainable with the multiple antenna element arrangement described above. Thus, the antenna elements for the end beams 12A and 20A are designed somewhat differently from the antenna elements for the center beams 14A, 16A, and 18A, so as to provide beams having a lower peak energy value (at about −3 decibels as related to the peak energy values of beams 14A–18A) and having a wider overlapping beam widths. This configuration provides a wide "capture" arc in which an approaching vehicle will first receive a guidance signal and be directed towards the guidance plane 10. In both FIGS. 1 and 2, and particularly in FIG. 2, there is a wide area of overlap between the individual beam positions, thus increasing the total time during which any particular receiver is exposed to guidance signals, and thereby raising the duty cycle of the signals at the receiver and improving the reliability and effectiveness of the operation in transmitting scanning beam information to a continuous wave receiver.

The radiation beam patterns shown in FIGS. 1 and 2 are particularly useful for azimuth guidance but the same beam patterns can be used for glide slope control. However, for the glide slope function, where "capture" of the guided craft is somewhat more easily accomplished, a four beam configuration is preferred in which the individual beams are somewhat narrower, preferably about 2° in width at the −3 decibel level, and the beam peaks may be preferably located for instance at about 1.3°, 2.7°, 4.1°, and 5.5° respectively above the horizon.

Figure 3:
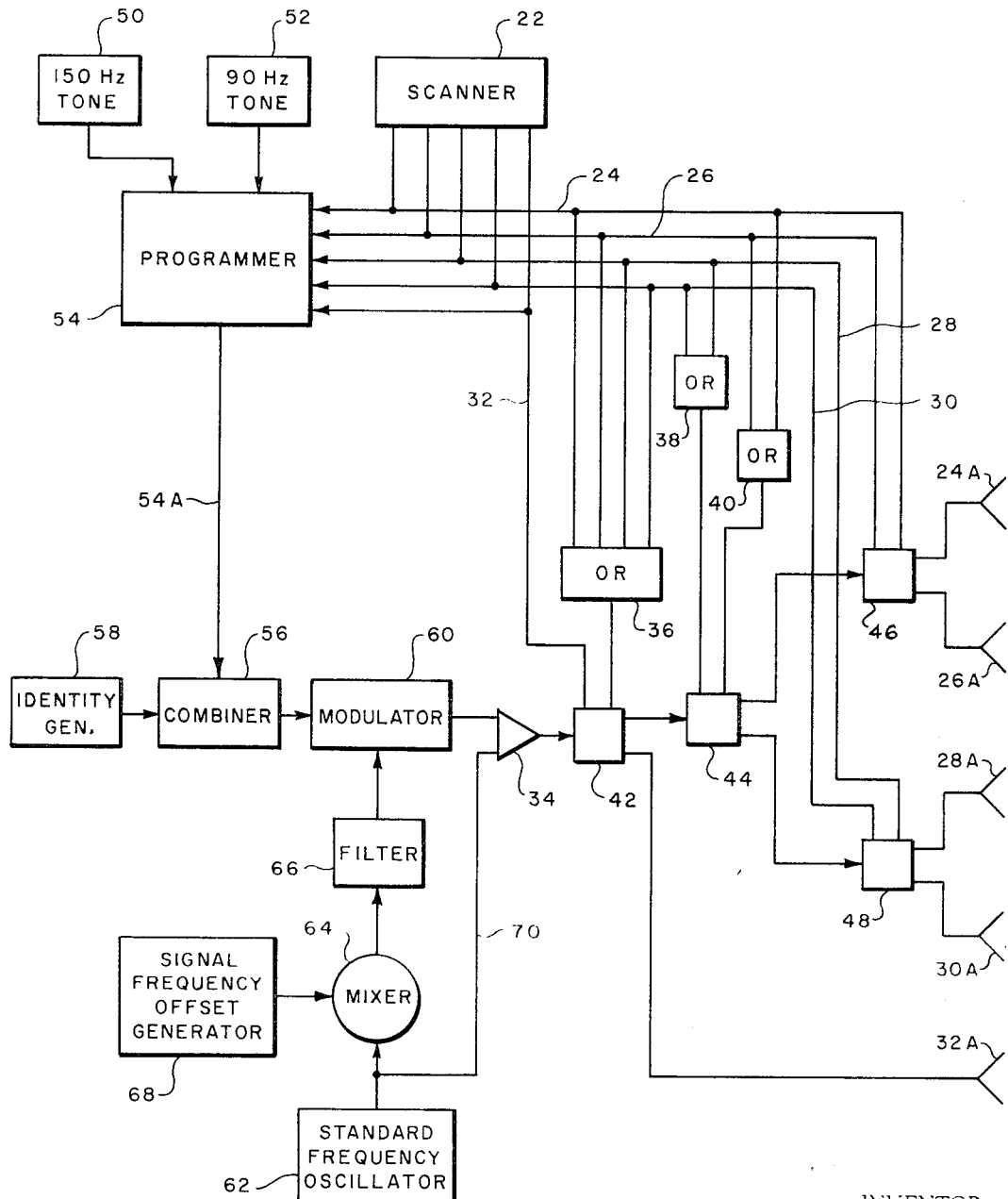
FIG. 3 is a schematic block diagram of the transmitter and antenna portions of a scanning beam guidance system in accordance with the present invention.

FIG. 3 is a schematic block diagram of a ground station transmitter system which may be employed in carrying out the method of the present invention. It includes a scanner 22 which emits switching signals on separate output lines 24, 26, 28, 30, and 32, in sequence, to switch the radio frequency energy in sequence to the different antenna elements 24A, 26A, 28A, 30A, and 32A. The radio frequency energy is supplied through an amplifier 34, and is switched through binary switches 42, 44, 46, and 48 controlled by direct connections from scanner 22, and by connections through OR gates 36, 38, and 40. Each of the scanner outputs 24–32 controls the sequence switching to a corresponding antenna 24A–32A. Thus, if scanner output 32 is on, it controls binary switch 42 to direct the radio frequency of amplifier 34 to the antenna 32A. When any one of the others of the scanner outputs 24–30 are on, the resultant switching signal supplied through OR gate 36 directs the radio frequency from amplifier 34 through binary switch 42 to the binary switch 44. If the scanner output is from 24 or 26, the resultant switching signal through OR gate 40 directs the radio frequency through switch 44 to binary switch 46 where the switching signal at 24 directs the radio frequency to antenna element 24A, or the switching signal at 26 directs the radio frequency to antenna 26A. In a similar manner, in response to switching signals on connections 28 and 30, OR gate 38 controls switch 44 to direct the radio frequency to switch 48 where it is finally directed either to antenna 28A or 30A. While this antenna switching network is arranged in terms of switching signals from the scanner which appear one at a time successively on the connections 24, 26, 28, 30, and 32, it will be understood that the scanner signals may be generated and utilized in a switching network in combinations of binary signals, to accomplish the same antenna switching result.

The two modulating frequencies, which may be preferably 150 Hz and 90 Hz are respectively obtained from oscillators or tone generators 50 and 52, from which they are supplied to a porgrammer 54. Programmer 54 is also arranged to receive the scanning signals from the scanner 22 and is operable to provide a programmed output at 54A which consists of sequentially occurring modulation signals synchronized with the operation of the scanner 22 to provide the correct instantaneous modulation ratio for each antenna element 24A–32A. These signals at 54A are combined, in a combiner 56, with signals from a station identity signal generator 58, and these combined modulation signals are supplied to a modulator 60 to modulate a radio frequency carrier wave which is then supplied to amplifier 34. The identity signal generator simply generates a tone at a conventional identity tone frequency, such as 1,020 Hz, and which is switched on and off in a Morse code sequence identifying the transmitter station, as is usual with ILS systems. The identity signals are combined in combiner 56 with the navigation modulation signals from programmer 54, without being synchronized with the scanning signals from scanner 22, since the identity signals do not requiree a scanning characteristic. The combiner 56 may be simply an amplifier having the two input connections from the programmer 54 and the identity generator 58, and providing an output in which the three tones, 150, 90, and 1,020 Hz may all be included, as required. The radio frequency carrier wave is supplied from a standard frequency oscillator 62 through a mixer 64 and a filter 66. The radio frequency wave from standard frequency oscillator 62 is offset by a fixed frequency by means of a signal supplied from an offset generator 68 and mixed with the standard frequency signal in mixer 64. The filter 66 is designed to select the predetermined offset radio frequency energy. The unmodulated standard frequency wave is supplied directly, without offset, through a connection 70, directly to the radio frequency amplifier 34. This provides a fixed frequency standard which is transmitted simultaneously with the information signals and which is recognized by the receiver to control the detector oscillators in the receiver and to stabilize the receiver. The use of a fixed standard frequency signal for this purpose is taught in a prior copending patent application Ser. No. 54,510 filed on July 13, 1970 by Donald J. Toman for a SYSTEM FOR GUIDANCE and assigned to the same assignee as the present application.

In a preferred embodiment of the invention which is designed to transmit guidance signals in the C band of microwave frequencies, the identity generator frequency may be on a 1,020 Hz tone, the standard frequency oscillator frequency may be 5,000.2 MHz and the signal frequency offset generator frequency may be 0.3 MHz to provide a radio carrier frequency which may be, for instance, 5,000.5 MHz. The offset generator frequency is selected to provide unique channels for different ground stations.

In order for the scanning wave signals to be effectively received and de-modulated by the continuous wave receiver, the rate of scan should preferably be at least twice the highest signal frequency. Accordingly, in the example given above, the scanning frequency is at least 2,040 Hz.

One interesting feature of the present invention, and particularly the form illustrated in FIG. 3, is that the course width may be varied by simply adjusting the programmer 54 to provide a different modulation program. The term "course width" refers to that area in the vicinity of the guidance plane 10 (FIGS. 1 and 2) in which the guidance signals are normally at a level which does not put the guidance indicator into saturation. When the vehicle being guided is outside of this "course width" area, the course indicator is in a saturated full scale indication calling for "steer left," or "steer right."

It is also possible, simply by changing the modulation programming, to make adjustments in the angle of the guidance plane. This is of particular interest when the system is used for the glide slope function for aircraft because different angles of descent are desirable for different aircraft.

The identity generator 58 generates a signal which identifies the particular station or airport. For this purpose, it generates Morse code signals which are sent at a rate of seven words per minute on a tone frequency of 1,020 Hz in accordance with ICAO standards.

The following is an example of a modulation program provided by the programmer 54 to provide a course width of plus or minus 3° with the beam pattern of FIG. 2. The following table assumes a 50 percent modulation of the carrier, and the modulation index for the respective modulation frequencies is given in terms of the contribution of each modulation signal frequency to the total modulation:

TABLE I

| Beam Identification | 90Hz Modulation Index | 150Hz Modulation Index |
|---|---|---|
| 12A | 0.4 | 0.1 |
| 14A | 0.4 | 0.1 |
| 16A | 0.25 | 0.25 |
| 18A | 0.1 | 0.4 |
| 20A | 0.1 | 0.4 |

The programmer 54 may preferably operate by digital synthesis of the modulation signal, and while separate tone generators 50 and 52 are illustrated in the drawing, the 90 and 150 Hz components of the programmed modulation signals may also be digitally synthesized. When the modulation signals are digitally synthesized, that function is accomplished within programmer 54 and tone generators 50 and 52 are omitted. Digital synthesis is particularly convenient for pulse width modulation (sometimes referred to herein as "pulse duration modulation") because the modulation frequencies are unvarying in amplitude and the individual pulse width modulation signals are highly repetitive. The modulator 60 is then basically a switch. The digital synthesis of the pulse width modulation signals may omit the step of generating the modulation frequencies, as such, and simply involve reading pulse width modulation signals in timed sequence from a "read-only" memory.

In the above mentioned Table I, the modulation is the same on beams 12A and 14A. On the other side, the modulation is the same on beams 18A and 20A. However, the information received by a vehicle receiver in response to these beams is nevertheless graded and directional in nature because of the overlaps of the beams. Thus, a vehicle receiver which is closer to the center of the beam pattern receives more overlapped beam signals in greater strength. In accordance with simple sampling theory, if the scanning frequency provided by scanner 22 is more than twice the modulation frequency of 150 Hz, then an observing receiver at a particular point in the field illuminated by the beams will detect the weighted sum of the modulations from all of the beams illuminating that point.

The receiver system which may be employed in the present invention is illustrated in FIG. 4. It includes an ILS localizer 110 and an ILS glide slope receiver 114. Both of these receivers feed signals to an ILS indicator 112. The localizer receiver 110 is operable in the normal VHF localizer frequencies in the band from 108 to 112 MHz. Continuous wave VHF localizer signals may be received from a localizer antenna 116 through a switch schematically shown at 120. The glide slope receiver is operable to receive signals at the usual glide slope frequency band from 328.6 to 335.4 MHz. Continuous wave VHF glide slope signals may be received from a glide slope antenna 118 through a switch element schematically shown at 122 and operable together with the switch element 120.

A microwave receiver and converter 124 is provided and connected to receive microwave guidance signals through a microwave antenna 126. These are the scanning wave signals from the FIG. 3 transmitter. The microwave signals include signals which are in conventional ILS format and they are converted within the receiver-converter 124, and in a translator 128, to signals which fall within the conventional VHF glide slope and localizer frequency bands. Thus, these signals can be supplied directly to the localizer and glide slope receivers 110 and 114 through connections 121 and 123 and the switches 120 and 122. Signals within the same microwave frequency band may also be received and converted by the receiver 124 and supplied through connection 125 to another navigational aid apparatus 131. Apparatus 131 may comprise a system which is a complete substitute for the localizer 110-glide slope 114 system and which provides more sophisticated navigational or landing aids. On the other hand, the apparatus 131 may simply supplement the information available from the localizer and glide slope receivers 110 and 114. For instance, the apparatus 131 may be a distance measuring equipment or an omnidirectional range equipment and may employ a portion of the microwave frequency band received by receiver 124 which is not required for the ILS localizer and glide slope functions.

As explained above, the transmitter arrangement of FIG. 3 illustrates a single function transmitter which is capable of providing the localizer function, for instance. It is intended that another substantially similar transmitter system would be employed to provide the other guidance function, such as glide slope, if desired. The receiver of FIG. 4 is adapted to receive both localizer and glide slope signals which may come from the separate transmitters such as the one illustrated in FIG. 3. It will be understood that these separate transmitters may, for convenience, be combined into one physical system. In any case, the identity generator 58 need not be repeated, and the connection 70 for the standard frequency oscillator transmissions need not be provided for in the other guidance function transmitter.

The receiver of FIG. 4 may preferably correspond in structure to the receiver which is disclosed and described in the above-mentioned previously filed copending patent application of Donald J. Toman. As described more fully in that previously filed patent application, the local oscillator within the microwave receiver 124 may be matched and standardized in frequency with respect to the transmitted carrier frequency signals by means of a standard frequency transmitted from the transmitter. This is the purpose of the signals from the standard frequency oscillator 62 of FIG. 3.

In the receiver system, the localizer and glide slope receivers 110 and 114, the ILS indicator 112, and the antennas 116 and 118 may be of conventional construction similar to that to be found in many VHF-ILS receivers which are now commercially available. For optimum performance, such receivers must have sufficient linear range to pass the scanning beam signal without distortion. Thus, where such receivers are already available in an aircraft, it is sufficient for the practice of the present invention to simply add to the aircraft installation the microwave components including the antenna 126, the receiver and converter 124, the translator 128, and the switching arrangements schematically illustrated by switches 120 and 122.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

We claim:

1. An improved method of transmitting radio signals for an instrument guidance system comprising
   generating radio carrier frequency energy,
   radiating the radio carrier frequency energy in a scanning beam having a predetermined space relationship with a prescribed guidance path plane to be established with portions of the scanning beam being spaced on each side of the guidance path plane,
   the direction of scan being substantially perpendicular to the guidance path plane,
   modulating the radio carrier frequency energy simultaneously with two different modulation signals,
   and varying the ratio of the respective amounts of modulation by said two different modulation signals as a function of the scanning of the scanning beam,
   the variation of said modulation ratio being substantially symmetrical about the guidance path plane so that said modulation signals are respectively dominant on opposite sides of the plane and the value of the ratio is one at the plane,
   the frequency of scanning of the scanning beam being at least twice the frequency of the highest of the modulation signal frequencies.

2. A method as claimed in claim 1 wherein
   the scanning beam is fan-shaped and has a narrow dimension transverse to the direction of energy propagation,
   the direction of the narrow dimension of said beam being substantially perpendicular to the guidance path plane,
   said narrow dimension being large enough to provide for substantial overlap of the pattern of radiation of the scanning beam when projecting in one direction with the pattern of the scanning beam when projecting in other directions.

3. An improved method of transmitting radio signals for an instrument guidance system comprising
   generating radio carrier frequency energy,
   radiating the radio carrier frequency energy in a scanning beam having a predetermined space relationship with a prescribed guidance path plane to be established with portions of the scanning beam being spaced on each side of the guidance path plane,
   the direction of scan being substantially perpendicular to the guidance path plane,
   modulating the radio carrier frequency energy simultaneously with two different modulation signals,
   and varying the ratio of the respective amounts of modulation by said two different modulation signals as a function of the scanning of the scanning beam,
   the variation of said modulation ratio being substantially symmetrical about the guidance path plane so that said modulation signals are respectively dominant on opposite sides of the plane and the value of the ratio is one at the plane,
   the radio frequency energy being radiated intermittently in the scanning beam and the modulation of the radio carrier frequency energy being carried out by individually controlling the length of each intermittent period of energization to establish a pulse duration modulation signal upon the radio carrier frequency energy.

4. An improved method of transmitting radio signals for an instrument guidance system comprising
   generating radio carrier frequency energy,
   radiating the radio carrier frequency energy in a scanning beam having a predetermined space relationship with a prescribed guidance path plane to be established with portions of the scanning beam being spaced on each side of the guidance path plane,
   the direction of scan being substantially perpendicular to the guidance path plane,
   modulating the radio carrier frequency energy simultaneously with two different modulation signals,
   and varying the ratio of the respective amounts of modulation by said two different modulation signals as a function of the scanning of the scanning beam,
   the variation of said modulation ratio being substantially symmetrical about the guidance path plane so that said modulation singals are respectively dominant on opposite sides of the plane and the value of the ratio is one at the plane,
   the radio frequency energy being radiated intermittently in the scanning beam and the modulation of the radio frequency energy being carried out by individually controlling the amplitude of the radio carrier frequency energy during each intermittent period of energization to establish a pulse amplitude modulation signal upon the radio carrier frequency energy.

5. A radio instrument guidance system comprising
   a ground station transmitter system including antenna means arranged to radiate a fan-shaped beam of radio energy which is scanned to different angles to define a prescribed guidance path in a geometric plane with the narrow dimension of the beam and the direction of scan being substantially perpendicular to said plane, a radio transmitting means including means for applying radio carrier frequency energy to said antenna means, means for simultaneously modulating the radio carrier frequency energy with two different modulation signals, and programming means operable in synchronism with the antenna scan for varying the ratio of the respective amounts of modulation by said two different modulation signals as a function of the scanning of the scanning beam, the variation of the modulation ratio being substantially symmetrical about the guidance path plane so that said different modulation signals are respectively dominant in the radio carrier frequency energy radiated on opposite sides of the plane and the modulation signals are substantially equal at the plane to thereby define the position of the plane in terms of radio signals, the scan operation of said antenna means to different angles being repeated at a frequency which is at least twice the frequency of the highest of the two modulation signal frequencies.

6. A system as claimed in claim 5 wherein
said programming means is operable in different selectable programs to provide for variation of the modulation ratio to achieve symmetry about different selected guidance path planes to thereby provide for selectable guidance path plane angles.

7. A system as claimed in claim 5 wherein
there is provided a separate source of modulation signals including information identifying a particular transmitter location,
said last-mentioned identification modulation signal source being connected to modulate the radio carrier frequency energy simultaneously with the previously mentioned modulation signals.

8. A system as claimed in claim 5 wherein
there is provided a fixed standard frequency oscillator having a fixed relationship to the frequency of said radio carrier frequency energy,
said radio transmitting means being operable to transmit said standard frequency along with the modulated radio carrier frequency energy for synchronizing the operation of a vehicle receiver with the modulated radio carrier frequency.

9. A system as claimed in claim 5 wherein
there is provided a vehicle mounted receiver means operable for receiving signals from said ground station transmitter system to enable the operator of the vehicle to follow the guidance path defined by said transmitter system,
said receiver means comprising a receiver which is normally operable to receive continuous wave signals.

10. A system as claimed in claim 9 wherein
said continuous wave receiver is operable to receive VHF instrument landing system guidance signals in the standard ILS system format from standard ILS transmitters,
the radio carrier frequency energy from said ground station transmitter being of microwave frequency,
and said receiver means includes a microwave receiver and converter for receiving the scanning wave guidance signals from said transmitter and for converting said signals to VHF signals for said VHF continuous wave receiver.

11. A radio instrument guidance system comprising
a ground station transmitter system including antenna means arranged to radiate a fan-shaped beam of radio energy which is scanned to different angles to define a prescribed guidance path in a geometric plane with the narrow dimension of the beam and the direction of scan being substantially perpendicular to said plane, a radio transmitting means including means for applying radio carrier frequency energy to said antenna means, means for simultaneously modulating the radio carrier frequency energy with two different modulation signals, and programming means operable in synchronism with the antenna scan for varying the ratio of the respective amounts of modulation by said two different modulation signals as a function of the scanning of the scanning beam, the variation of the modulation ratio being substantially symmetrical about the guidance path plane so that said difference modulation signals are respectively dominant in the radio carrier frequency energy radiated on opposite sides of the plane and the modulation signals are substantially equal at the plane to thereby define the position of the plane in terms of radio signals, said antenna means comprising a plurality of separate antenna elements having different angular orientations, said means for applying radio frequency energy to said antenna means being operable to apply said radio frequency energy sequentially to the separate antenna elements in the form of an individual burst of radio frequency energy at each antenna element to thereby provide for a scanned beam by sequential radiation from said individual antenna elements.

12. A system as claimed in claim 11 wherein
said means for modulating the radio carrier frequency energy is operable synchronously with said means for applying the radio carrier frequency energy to said antenna means,
said modulating means being operable for modulating the length of each burst of carrier energy in the sequence of bursts supplied to separate antenna elements to thereby provide pulse duration modulated signals.

13. A system as claimed in claim 11 wherein
said means for modulating the radio carrier frequency energy is operable synchronously with said means for applying the radio carrier frequency energy to said antenna means,
said modulating means being operable for modulating the amplitude of each burst of carrier energy in the sequence of bursts applied to separate antenna elements to thereby provide pulse amplitude modulation signals.

14. A system as claimed in claim 11 wherein
said separate antenna elements of said antenna means are arranged with non-uniform spacing and are physically proportioned to radiate separate beams which have different complementary characteristics to provide a scanned radiation pattern having a high degree of resolution at the central portion thereof defining said prescribed guidance path, and having low resolution wide angle beams at the side edge portions of the radiation pattern set up by the scanning beam.

15. A system as claimed in claim 14 wherein said antenna elements are designed to provide a plurality of closely spaced narrow beams in the near vicinity of said prescribed guidance path and relatively widely spaced wider beams having lower peak radiation power at the side edge portions of the radiation pattern.

* * * * *